United States Patent [19]

Kehoe et al.

[11] 4,252,830
[45] Feb. 24, 1981

[54] CHEWABLE CALORIE-FREE CHEWING GUM BASE

[75] Inventors: Gary Kehoe, South Salem; Wayne J. Puglia, Bellerose Village; Frank Witzel, Spring Valley, all of N.Y.; Dominick R. Friello, Danbury, Conn.; Donald A. M. Mackay, Pleasantville, N.Y.

[73] Assignee: Life Savers, Inc., New York, N.Y.

[21] Appl. No.: 49,536

[22] Filed: Jun. 18, 1979

[51] Int. Cl.$^3$ ............................................... A23G 3/30
[52] U.S. Cl. .......................................... 426/5; 426/3; 426/548; 426/804
[58] Field of Search ........................... 426/3-6, 426/548, 804

[56] References Cited

U.S. PATENT DOCUMENTS

| | | | |
|---|---|---|---|
| 2,076,112 | 4/1937 | Barker | 426/4 |
| 2,438,551 | 3/1948 | Fenimore | 426/3 |
| 2,525,072 | 10/1950 | Kearby | 426/3 |
| 2,973,273 | 2/1961 | Curtiss | 426/5 |
| 3,912,817 | 10/1975 | Sapsowitz | 426/5 |
| 4,065,579 | 12/1977 | Mackay et al. | 426/3 |

*Primary Examiner*—Jeanette M. Hunter
*Attorney, Agent, or Firm*—Lawrence S. Levinson; Burton Rodney

[57] ABSTRACT

A chewable chewing gum base is provided which is substantially calorie-free, does not decrease in viscosity upon chewing inasmuch as it is essentially free of water-solubles, and includes gum base containing high levels of inert fillers, such as calcium carbonate or talc in amounts of at least about 50% by weight, softeners, such as lecithin, synthetic non-caloric sweeteners, such as aspartame or cyclamates, and flavors. The chewable gum base includes at least about 10% air voids entrapped in the gum base matrix which, upon chewing, become filled with moisture causing a dramatic increase in cud volume.

9 Claims, No Drawings

CHEWABLE CALORIE-FREE CHEWING GUM BASE

The present invention relates to a substantially calorie-free chewable flavored gum base which includes gum base containing inert fillers or texturizing agents in amounts of at least about 50% by weight up to 80% or more, and softeners and non-caloric sweeteners, in place of the normally high caloric corn syrup, sugar alcohols and sugars. The gum base includes at least about 10% air voids, entrapped therein and created during the manufacturing process, which are filled with water upon chewing causing a dramatic increase in cud volume of the gum base.

Sugarless chewing gums presently marketed include a major portion of water-solubles in the form of sugar alcohols, such as sorbitol and/or mannitol and/or xylitol, as sugar and corn syrup substitutes. While the sugarless chewing gums may be classified as non-cariogenic, they are not non-caloric. The sugar alcohols have the same caloric content as carbohydrates, thus would not be a recommended item for the truly diet conscious.

the sugar-containing gums contain major portions of water-solubles in the form of corn syrup as a softener or plasticizer and sugars such as sucrose, dextrose and/or fructose. These materials, which are carbohydrates, have a caloric value of approximately 4 calories per gm.

Upon chewing of either the sugarless or sugar-containing chewing gums, the water-solubles which make up a major portion of the gum, for example, 75% or more, are consumed thereby causing the viscosity of the gums to decrease rapidly and the cud volume to shrink.

The above viscosity and cud volume problems could conceivably be resolved by formulating a chewing gum made primarily of conventional chewing gum base. However, it has been found that conventional gum base, which contains less than 2% air voids, is initially extremely hard and therefore too difficult to chew at first.

In accordance with the present invention, a chewable chewing gum base is provided which is initially soft and chewable, may be calorie-free, if desired, does not decrease in viscosity or shrink upon chewing, and remains soft upon prolonged chewing. The chewable chewing gum base composition contains gum base which includes at least about 10%, and preferably from about 12 to about 18% air voids entrapped in the gum base matrix and has a density ranging from about 1.5 to about 1.75 gm/cc, and preferably from about 1.63 to about 1.67 gm/cc, and further includes one or more inert fillers and/or texturizers, as well as synthetic non-caloric sweeteners, flavors and softeners and other conventional, substantially calorie-free ingredients.

It will be appreciated that although some of the ingredients in the chewable gum base of the invention may not be calorie-free, these ingredients are bound up in the gum base and are not extracted therefrom during chewing and therefore do not significantly contribute to the extractable caloric content of the chewable gum base.

Conventional chewing gum includes a large proportion of plasticizers and softeners which are exemplified by corn syrup and/or sugar alcohols such as sorbitol, mannitol and/or xylitol. In accordance with the present invention, these high calorie components are replaced by the substantially calorie-free fillers and texturizing agents which impart the desired softness and texture to the chewing gum base.

The chewable gum base of the invention is initially soft partly due to the relatively large volume of air voids and remains soft inasmuch as it is essentially free of water-extractables. Upon chewing, the gum base does not increase in viscosity, cud volume loss is minimized, and, in fact, air voids within the gum base matrix are filled with saliva thereby causing the cud to swell. Moreover, collection of saliva in the air voids minimizes hydration of the gum base thereby preventing the cud from becoming undesirably soft and inhibiting loss of cohesivity upon chewing.

In some respects, the chewable chewing gum base of the invention is more similar to conventional chewing gum in chewing characteristics than to gum base even though it essentially contains only gum base ingredients plus flavor and sweetener. The reason for this is the large volume of air trapped in the chewable gum base, for example at least about 15% trapped air, while conventional chewing gum contains from 10 to 13% trapped air, and chewing gum base contains only 1 to 3% trapped air. However, the air voids present in the chewable gum base of the invention become filled with moisture, upon chewing, resulting in a cud volume increase of 100% or more. In contrast, chewing of conventional chewing gum results in a cud volume loss of from 5 to 15%.

The chewable chewing gum base of the invention includes a relatively water-insoluble, non-digestable, substantially calorie-free gum base.

As indicated, the fillers and/or texturizing agents are essential components of the chewable gum base of the invention. The fillers and texturizing agents are present in an amount of at least about 50%, and preferably ranging from about 55 to about 85% by weight, and more preferably from about 60 to about 80% by weight of the chewing gum base. Examples of such substantially calorie-free insoluble non-extractable fillers and/or texturizing agents suitable for use herein include, but are not limited to, calcium carbonate, aluminum hydroxide, alumina, magnesium carbonate, dicalcium phosphate, talc (3MgO.4SiO$_2$.H$_2$O), magnesium trisilicate, magnesium hydroxide, aluminum silicates and combinations thereof. Mild abrasives for tooth cleaning or plaque reduction may also be employed without fear of undesirable extraction.

The above fillers and/or texturizing agents will remain in the gum base without significant release, even after chewing for hours.

Other typical examples of the ingredients found in the chewing gum base include masticatory substances of synthetic origin, such as styrene-butadiene copolymer, isobutylene-isoprene copolymer, polyisobutylene, polyethylene, petroleum wax, polyvinyl acetate, as well as masticatory substances of natural origin such as rubber latex solids, chicle, crown gum, nispero, rosidinha, jelutong, pendare, perillo, niger gutta, tunu, etc. The elastomer or masticatory substance will be employed in an amount within the range of about 1 to about 5%, preferably from about 1 to about 3%, and optimally from about 1.5 to about 2.5% by weight of chewable gum base composition.

In addition, the gum base will preferably contain a solvent for the elastomer which should have minimal tackifying properties and will preferably comprise hydrogenated ester gum, that is, glycerol ester of hydrogenated rosin and/or dimerized ester gum. However, other solvents may be employed, such as pentaerythritol ester gum, polymerized ester gum, and ester gum.

The solvent will be employed in an amount ranging from about 2 to about 6%, preferably from about 3 to about 4.5%, and optimally from about 3.75 to about 4.25% by weight of the gum base.

The gum base may also include a hydrophilic-type detackifier which will sorb saliva and become slippery and is incompatible with the elastomer and solvent for the elastomer. Examples of such materials suitable for use herein will include vinyl polymers having a molecular weight within the range of from about 2000 to about 10,000 or more, such as polyvinyl acetate, polyvinyl butyl ether, copolymers of vinyl esters and vinyl ethers.

The hydrophilic-type detackifier will be employed in an amount within the range of from about 3 to about 7.5% by weight of the gum base, preferably from about 4 to about 6.5% and optimally from about 4.75 to about 5.25% of the gum base.

The gum base may also include hard waxes which serve as lubricants and should have a melting point of above about 65° C. and preferably above about 75° C. Examples of such hard waxes include candelilla wax, paraffin wax, carnauba wax, ozokerite, oricury, microcrystalline wax, and the like. The hard waxes will be employed in an amount within the range of from about 0 to about 7% by weight of the gum base, preferably from about 3 to about 5%, and optimally from about 3.75 4.5% by weight. The preferred hard waxes are candelilla wax and paraffin wax employed in combination so that from 0.75 to about 1.25% (based on the weight of the gum base) of the candelilla is employed with from about 2.75 to about 3.25% (based on the weight of the gum base) of the paraffin wax. The waxes are found to reduce the tackiness of the final gum composition without significantly reducing cohesivity thereof.

The gum base may also include a softening agent and lubircant combination which may comprise one or more hydrogenated vegetable or animal fats (Hydrofol) having a high melting point, that is, above about 22° C., and preferably above about 50° C.; such softening agent and/or lubricant may be employed in amounts ranging from about 0 to about 5% by weight of the gum base, preferably from about 0.5 to about 3%, and optimally from about 1 to about 2%. Examples of softeners suitable for use herein include, but are not limited to, glycerol monostearate, lecithin, coconut oil, fatty acids such as stearic, oleic and palmitic, partially hydrolyzed polyvinyl esters, waxes such as carnauba wax, candelilla wax and beeswax wax, and cellulose derivatives.

The chewing gum may also contain hydrophilic type plasticizers suitable for use herein, but not limited to partially hydrolyzed polyvinyl acetate, carnauba wax, beeswax, cellulose derivatives such as methyl cellulose and carboxy methyl cellulose and various hydrophiles such as propylene glycol and glycerine and combinations of any two or more of the above.

The gum base will also include an emulsifier to impart hydrophilic properties to the gum base so that saliva will be absorbed thereby making the gum base slippery; the emulsifier will be employed in amounts ranging from about 0 to about 10% by weight of the gum base, preferably from about 3 to about 9%, and optimally from about 6 to about 8%. Examples of such emulsifiers include glyceryl monostearate, phosphatides, such as lecithin and cephalin, Tweens, Spans and mixtures thereof.

In addition, the gum base may include colorants such as titanium dioxide, plasticizers, such as lanolin, stearic acid, sodium stearate, potassium stearate and the like, antioxidants, in an amount up to 1000 ppm of the gum base, such as butylated hydroxyanisole, butylated hydroxytoluene, and propyl gallate.

The chewing gum may also include water in amounts ranging from about 0 to about 3% by weight, and preferably from about 0.5 to about 2.5% by weight, and most preferably, as little water as possible.

The gum base including the built-in air voids is prepared by heating and/or blending the various ingredients as mentioned above as described hereinafter.

The water-insoluble gum base may consist of any of the various bases disclosed for example in U.S. Pat. Nos. 3,052,552 and 2,197,719. Typical ingredients included in gum base compositions are the following:

|  | Parts by Weight |
| --- | --- |
| Base I |  |
| Ester gum | 88 |
| Rubber latex solids | 10 |
| Lecithin | 2 |
| Base II |  |
| Chicle | 30 |
| Jelutong | 60 |
| Gutta soh | 8.5 |
| Lecithin | 2 |
| Base III |  |
| Partially oxidized chicle | 98 |
| Lecithin | 2 |
| Base IV |  |
| Jelutong (dry) | 80 |
| Gutta siak | 18 |
| Lecithin | 2 |

The chewable gum base may also include flavoring, such as sour or fruit flavoring or non-acid or mint flavoring in an amount ranging from about 0.1 to about 2% by weight, and preferably from about 0.75 to about 1.25% by weight of the final chewable gum base product. The flavoring may comprise synthetic flavors and oils derived from plants, leaves, flowers, fruit, etc. Representative fruit flavor adjuncts include acids such as adipic, succinic and fumaric acid, and citrus oils such as lemon oil, orange oil, lime oil, grapefruit oil, and fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewable gum base with or without conventional preservatives.

In addition, as mentioned hereinbefore, the chewable gum base may include a substantially calorie-free sweetener in an amount within the range of from about 0.1 to about 1% by weight, and preferably from about 0.25 to about 0.8% by weight of the chewable gum base, such as poorly water-soluble as well as water-soluble sweeteners, such as the free acid form of saccharin, sodium calcium or ammonium saccharin salts, dihydrochalcones, glycyrrhizin, glycyrrhizic acid ammonium salt, L-aspartyl-L-phenylalanine methyl ester, as well as *Stevia rebaudiana* (Stevioside), *Richardella dulcifica* (Miracle berry), *Dioscorephyllum cumminsii* (Serendipity Berry), free cyclamic acid and sodium or calcium cyclamate salts, and the like, or mixtures of any two or more of the above.

Where long-lasting sweetness is desired, the sweetener may be employed in particulate form so as to have an average particle size of less than 150 microns, and preferably less than 100 microns.

The chewing gum base of the invention including the air voids may be prepared as follows. A standard gum base or bases, comprising approximately 15 to 35% of the total product, is added to a steam jacketed kettle equipped with a sigma blade mixer. The temperature of the kettle is maintained at about 140°–180° F. At this point softener, such as lecithin is added to the base and mixed for several minutes. Filler-texturizer, such as calcium carbonate is then added slowly. The quantity of this finely divided water insoluble material is such that the mixture begins to tear apart, forming discrete pieces of base, emulsifier, finely divided water insoluble, and air. Flavor and synthetic sweetener are then added. The plasticizing action of the flavor brings the mass together where it can be removed from the kettle and formed into a desired shape, such as sticks, tablets, blocks and the like.

The following Examples represent preferred embodiments of the invention.

EXAMPLE 1

A chewable gum base having the following composition is prepared as described below.

TABLE I

| CHEWABLE GUM BASE | |
|---|---|
| Ingredients | Parts by Weight |
| PVA (polyvinyl acetate) | 5 |
| CaCO$_3$ | 75 |
| SBR Copolymer | 2 |
| Arochem | 2 |
| Hydrofol | 1 |
| Candelilla wax | 1 |
| Glyceryl Monostearate | 1 |
| Paraffin Wax | 3 |
| Stabelite Ester No. 5 | 2 |
| BHA | 0.01 |
| Lecithin | 7 |
| Aspartame | 1 |
| Flavor | 1 |

Polyvinyl acetate, styrene-butadiene copolymer, Arochem (glyceryl ester of dimerized rosin), Hydrofol (hydrogenated animal fat), candelilla wax, paraffin wax, glyceryl monostearate, Stabelite ester No. 5 (hydrogenated glyceryl ester of rosin), and BHA (butylated hydroxyanisole) are added to a steam jacketed kettle equipped with a sigma blade mixer. The temperature of the mixer is maintained at 160° F. At this point, lecithin is added and the mix is mixed for several minutes. Calcium carbonate is then added slowly. The mixture begins to tear apart, forming discrete pieces of base and emulsifier, finely divided water-insoluble and air. Flavor and sweetener are then added and mixed for about 1 minute. The plasticizing action of the flavor brings the mass together where it is removed from the kettle and formed into sticks or cubes.

The so-formed chewable gum base of the invention is comprised of about 98.6% gum base, has an almost non-existent calorie content of 0.235 calories per gram (less than one calorie per piece), does not increase in viscosity upon chewing, even in the presence of a dramatic increase in cud volume due to an external hydration. The unexpected cause of this phenomena is the fact that at least 15% air is entrapped in the gum base matrix upon chewing. The air voids become filled with moisture, resulting in the cud volume increase. The absence of water-soluble extractables insures against disintegration and that the basic formula does not change upon chewing.

In order to demonstrate the advantages of the chewable gum base of the invention, the chewable gum base prepared as described above is compared with conventional sugarless chewing gum and conventional chewing gum base. The composition of the conventional gum base is outlined below.

TABLE II

| TYPICAL CONVENTIONAL GUM BASE | |
|---|---|
| Ingredient | Parts by Weight |
| Candelilla Wax | 5 |
| Paraffin Wax | 13 |
| Polyvinyl Acetate | 22 |
| SBR Copolymer | 9 |
| CaCO$_3$ | 20 |
| Stabelite Ester No. 5 | 11 |
| Arochem | 7 |
| Hydrofol | 7 |
| Glyceryl Mono Stearate | 6 |

Upon examination of the conventional chewing gum, chewable gum base of the invention and conventional gum base, the following results are obtained.

Conventional sugarless chewing gum, containing mostly water soluble sweeteners, binders and the like, undergoes a decrease in cud volume from 0 time through 30 minutes. It is normally assumed, however, that almost all of the water solubles are chewed out of the gum after five minutes, leaving only gum base, flavor and perhaps some traces of water solubles. In order to demonstrate the above, cud volumes of the conventional sugarless gum are calculated starting at 5 minutes (no water solubles), 10, 15, and 20 minutes. The result is an overall decrease in cud volume of 8% throughout this period. This indicates loss of volume and no moisture pick up because hydration occurs during processing and not during chewing.

By contrast, cud volumes of the chewable base product of the invention are calculated at 0 time, every 5 minutes to 20 minutes and an increase in volume of over 100% is noted. This indicates a dramatic moisture gain without decomposition.

A complete summary of the similarities and differences between chewing gum, chewing gum base, and chewable gum base are outlined below.

| Mechanism | Conventional Chewing Gum | Invention - Chewable Gum Base | Conventional Gum Base |
|---|---|---|---|
| Ease of Chewing | Soft | Soft | Hard |
| Air Content | 12% | 15% | 1.7% |
| Hydration Method | In Kettle | Upon Chewing | No hydration |
| % Water Solubles | 70–80% | 1.3% | 0% |
| % Volume Change | −8% | +100% | Not chewable |
| Site of Hydration | Mostly hydrophilic | Mostly hydrophobic | Mostly hydrophobic |
| Air Entrapment | Due to finely divided water soluble | Due to finely divided water insoluble | Not applicable |

What is claimed is:

1. A substantially calorie-free chewable gum base comprising substantially calorie-free gum base, from about 50 to about 85% by weight of a substantially calorie-free inert filler or texturizing agent which is calcium carbonate, aluminum hydroxide, alumina, magnesium carbonate, talc, aluminum silicates, dicalcium phosphate, magnesium trisilicate, magnesium hydroxide, or mixtures thereof, from about 0.1 to about 5% by weight of a substantially calorie-free sweetener, and a substantially calorie-free softener, said chewable gum base including at least 10% air voids entrapped in the gum base matrix, which, upon chewing, become filled with moisture, said gum base being essentially free of calorie containing water-extractables.

2. The chewable gum base as defined in claim 1 wherein said substantially calorie-free softener is present in an amount of from about 5 to about 10% by weight.

3. The chewable gum base as defined in claim 1 wherein said filler or texturizing agent is calcium carbonate or alumina or mixtures thereof.

4. The chewable gum base as defined in claim 2 wherein said softener is selected from the group consisting of lecithin, coconut oil, fatty acids, glycerol stearate, polyvinyl alcohol, cellulose derivatives and mixtures thereof.

5. The chewable gum base as defined in claim 1 wherein said sweetener is selected from the group consisting of sodium saccharin, calcium saccharin, ammonium saccharin, the free acid form of saccharin, sodium cyclamate, calcium cyclamate, free cyclamic acid, dihydrochalcones, glycyrrhizin, glycyrrhizic acid ammonium salt, L-aspartyl-L-phenylalanine methyl ester and mixtures thereof.

6. The chewable gum base as defined in claim 1 further including a substantially calorie-free flavor.

7. The chewable gum base as defined in claim 1 wherein said filler or texturizing agent is present in an amount within the range of from about 60 to about 80% by weight of said gum base.

8. The chewable gum base as defined in claim 1 including from about 12 to about 18% by weight air voids in said gum base matrix.

9. The chewable gum base as defined in claim 1 having a density within the range of from about 1.5 to about 1.75 gm/cc.

* * * * *